United States Patent Office 3,832,273
Patented Aug. 27, 1974

3,832,273
COMPOSITE REFRACTORY ARTICLES
Michael P. O'Connor, Jr., Livonia, Mich., assignor to The Carborundum Company, Niagara Falls, N.Y.
Filed May 15, 1972, Ser. No. 253,482
Int. Cl. B32b 1/08, 15/14
U.S. Cl. 161—182
1 Claim

ABSTRACT OF THE DISCLOSURE

The invention provides a porous, fibrous substrate and composite refractory articles in which the substrate serves as a re-enforcement against thermal and shock stresses. The substrate is made from refractory inorganic fibers, the substrate serving as a base for the deposition of a suitable layer of refractory material which may be applied by any of several known methods. The substrate and adhering refractory layer may then be dried together to produce a composite refractory article or the dried article may be fired to give a composite article with a densified refractory layer. In either case the substrate remains firmly attached to the refractory layer and functions as a mechanical re-enforcing and thermal insulating substrate for the resulting composite refractory article. The articles may be further strengthened by providing a layer of re-enforcing metal over the outer surface of the composite article. The metal layer may be a casting or a sheet metal casing shaped to enclose and provide support for the article at its point of use.

BACKGROUND OF THE INVENTION

A number of well known methods are available for the production of refractory articles. Of these, slip casting methods are among the most common for making shaped refractories. In prior processes, a nonsettling liquid slurry of finely divided refractory material and a bonding agent is poured into a dry porous mold, which is usually made of plaster. The dry mold absorbs liquid from the slurry, building up on the mold surface a coating of refractory particles mixed with bonding agent and thus forming an even layer of solid material conforming to the surface of the mold. When the desired thickness of material has been deposited, the excess slurry is removed and the coating (or "casting") is allowed to dry and is then removed from the mold for firing. The plaster mold is dried, either by air drying or oven drying, and is then ready for reuse.

Ceramic articles made by this or similar processes have found many uses in both domestic and industrial applications, their main limitation having been a lack of tensile strength, causing the article to crack or shatter if it is exposed to vibrational or bending stresses. Since a common industrial use of refractories relies on their superior resistance to heat and chemical attack, composite re-enforced refractories have been developed for such exposures in which the refractory may be subjected to combined heat, chemical attack and mechanical stresses. While a re-enforcing component may be introduced directly into the refractory composition, this may have the undesirable effect of lowering the heat resistance of the refractory or setting up stresses within the refractory body due to unequal expansion and contraction of the re-enforcing component as compared to the refractory itself. In some cases a desirable re-enforcing material may not be compatible with the refractory matrix or may lose strength at the temperatures to which the refractory is exposed. The choice of suitable refractory re-enforcing components is therefore difficult, so that prior types of refractory composites, designed for overall thermal and shock resistance, have not been completely satisfactory in those regards due either to low mechanical strength or inadequate heat resistance.

SUMMARY OF THE INVENTION

The invention pertains to composite refractory articles having a layer of refractory material in combination with a fibrous refractory substrate which acts as a thermal and shock resisting re-enforcement. Composite refractory articles may be made by depositing a layer of refractory material on the substrate and then drying the substrate with the adhering refractory layer to produce the composite article. The drying step may be followed by a firing step to produce a composite article having a refractory component of increased density and strength. The composite articles may be further re-enforced by providing a metallic cover which protects the fibrous substrate and acts as a mounting means for the composite article.

DESCRIPTION OF THE INVENTION

Figure 1:
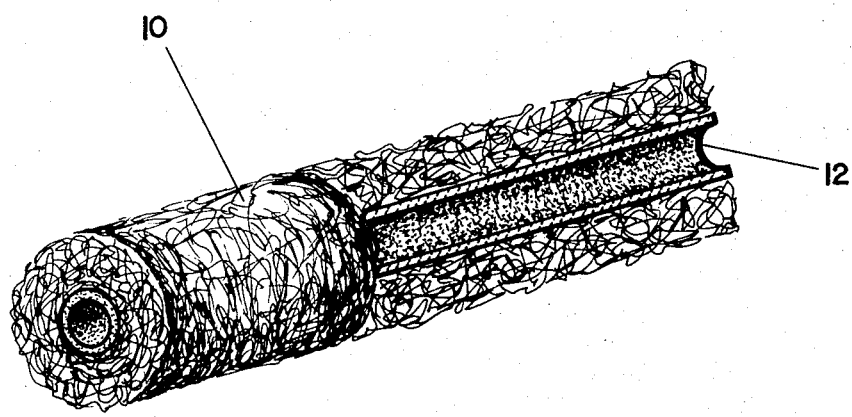
FIG. 1 shows a partial sectional side view of a composite article, showing the fibrous substrate with a layer of refractory material.

The composite refractory articles of the invention are formed by the deposition of a layer of refractory material upon a suitable porous fibrous substrate, the composite article then being dried and fired to give a composite refractory article in which the fibrous substrate acts as a thermal and shock resistant re-enforcement. While the fibrous substrate can be formed by several methods, a preferred method is to form the substrate body on a perforated mandrel, the mandrel being immersed in a liquid slurry of fibrous material. Vacuum applied to the mandrel then gives a fibrous deposit corresponding to the shape of the mandrel and the fibrous shape is then removed and dried to give the desired substrate. The refractory layer may be deposited upon this substrate by any convenient method, but a slip-casting technique is preferred. Methods for slip casting on porous substrates are well known, but these methods include removal of the porous substrate after the slip cast layer is formed. In the present invention however, the fibrous substrate is not separated from the deposited layer of refractory material, but remains attached during subsequent drying and firing operations.

While the fibers used in the substrate may comprise any suitable inorganic fiber, refractory fibers made from materials such as glass, silica, aluminum silicate, alumina, silicon carbide, boron carbide, silicon nitride, boron nitride, graphite, carbon and mixtures of these are preferred for refractory operations. Small amounts of binding agents such as starch, methocel, dextrin, colloidal silica and the like may be added as required to impart dimensional stability to the fibrous substrate.

Any suitable refractory material may be deposited upon the substrate, the preferred refractories being those such as silicon, silica, aluminum silicate, zirconium silicate, alumina, silicon carbide, boron carbide, silicon nitride, boron nitride and mixtures thereof. The refractories may be combined with binding agents such as colloidal silica, dextrin, clay, starch, Methocel or mixtures of these to enhance the mechanical stability of the refractory layer during its deposition on the substrate. During the deposition of the material on the fibrous substrate, a bonding action may take place at the interface between them whereby the substrate strengthens the deposited layer of refractory and cushions it against vibrational shock as well as providing a thermal insulating layer.

After the layer of refractory material has been deposited on the fibrous substrate the composite article is then dried in an oven at approx. 200° F. If appropriate binders have been used, the resulting composite refractory article may be strong enough after oven drying for use in many applications which require a heat and vibration resistant article. Such an oven dried article may later be exposed to specific service applications under temperature conditions which will develop a sintered ceramic bond in the deposited refractory coating. The addition of about 10% (by weight) of a bonding agent such as colloidal silica ("Ludox HS40") to the refractory layer during deposition will provide a dried ceramic coating with substantial dry strength which can later develop a sintered bond by exposure to temperatures within the range of 1700 to 2200° F., during use under subsequent high temperature service conditions.

For those applications which require a denser sintered refractory, the dried composite article is further fired at temperatures ranging from about 1700° to about 2200° F., with a mid-range of 1900° F. being preferred. Prolonged firing at the upper temperature range is undesirable, since the ceramic fibers of the substrate may be weakened and lose part of their re-enforcing properties. The fired composite article is well adapted to temperature applications where both thermal and mechanical stresses are present.

The properties of the composite articles of the invention may be varied to suit a particular end use by the proper selection of both the fibers making up the substrate and the refractory material deposited thereon. If a high degree of reinforcement is required, for example, the substrate may contain continuous filaments of high melting metals or of carbon or graphite fibers, while thermal insulation may be controlled by varying the thickness and density of the substrate.

While the composite refractory articles of the invention are highly suitable for applications where resistance to heat and mechanical shock are required, many of these applications require that the refractory article also be resistant to external wear and abrasion. The substrates used for these articles are fibrous and as such are relatively soft and have low resistance to abrasion. To protect the substrate, therefore, it is desirable to cover it with a layer of some suitable metallic material such as aluminum, copper, brass, zinc, magnesium, iron, steel or the like. Alloys of these metals may also be employed. The metallic cover is applied after the drying and firing steps of fabrication have been completed, the cover being formed by casting, spraying, electroplating or winding with suitable wire or metallic tape. The cover may also be fabricated from sheet metal, formed into a split casing, which is then applied to enclose the outer surfaces of the fibrous substrate.

Besides serving as a protective cover for the composite refractory article, the metal cover also provides a means for mounting and securing the refractory article in its use position, the metal cover being provided with bolt holes, attachment lugs, clamps or other holding devices as required for the satisfactory attachment of the composite refractory article to its point of use. The metal covering also acts as a mechanical re-enforcement for the composite article, allowing the construction of articles of extended length and in configurations which would otherwise be lacking in the necessary mechanical strength.

Figure 2:
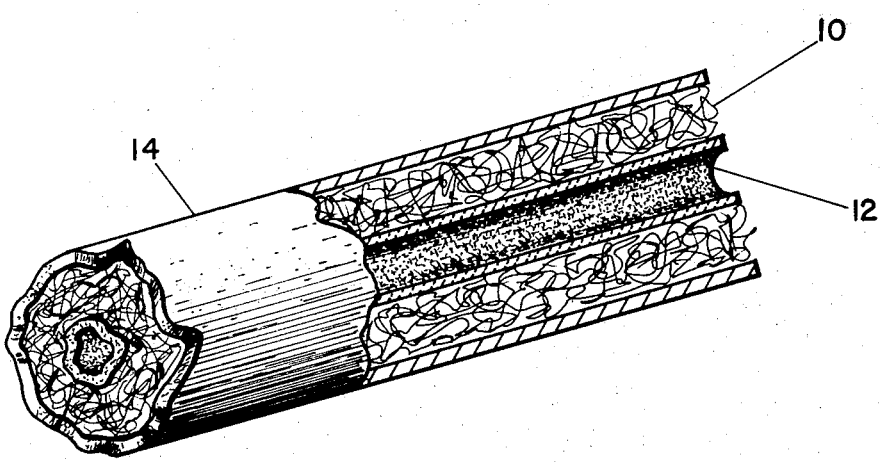
FIG. 2 shows a partial sectional side view of a composite article showing the fibrous substrate with a metal cover.

The basic construction of the composite refractory article of the invention is shown in FIG. 1. The fibrous substrate 10 is formed into the desired shape and a layer of refractory material 12 is deposited in contact with the substrate. The composite article is then oven dried to give a composite refractory article. Stronger articles with denser refractory linings may be made by firing the article after oven drying. A composite refractory article with an additional metallic re-enforcement is shown in FIG. 2 where the metallic cover is shown at 14. In these articles, the fibrous substrate 10 cushions the refractory 12 from mechanical shock as well as providing thermal insulation. The metallic cover 14 further protects the soft substrate and furnishes a support means for the composite article. Although the description refers to a linear shaped substrate and refractory article, the invention is not limited to this shape alone but may be applied to other shapes of substrates and refractory articles as desired, subject only to limitations imposed by the basic fabrication techniques themselves.

What is claimed is:

1. A composite refractory article comprising a mass of inorganic refractory fibers defining a tubular, porous substrate having an inner and outer surface, and a layer of refractory material deposited upon said inner surface, said refractory fibers selected from the group consisting of silica, alumina silicate, alumina, silicon carbide, boron carbide, silicon nitride and boron nitride and said refractory material being selected from the group consisting of silicon, silica, aluminum silicate, alumina, silicon carbide, boron carbide, silicon nitride and boron nitride, and a protective metal cover in contact with said outer surface, said metal being selected from the group consisting of aluminum, brass, copper, zinc, magnesium, iron and steel.

References Cited

UNITED STATES PATENTS 3,139,048    6/1964    Hall _____ 161—213

MARION E. McCAMISH, Primary Examiner

U.S. Cl. X.R.

161, 168, 170, 206, 207, 213, 225